(12) United States Patent
Kawamura et al.

(10) Patent No.: US 8,344,570 B2
(45) Date of Patent: Jan. 1, 2013

(54) INTERIOR PERMANENT MAGNET ROTOR, ELECTRIC MOTOR USING THE SAME AND ELECTRIC DEVICE

(75) Inventors: Kiyomi Kawamura, Osaka (JP); Takashi Ogawa, Osaka (JP); Hiroshi Murakami, Osaka (JP); Yuichi Yoshikawa, Osaka (JP); Yasuyuki Yokouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 194 days.

(21) Appl. No.: 12/934,187

(22) PCT Filed: Mar. 6, 2009

(86) PCT No.: PCT/JP2009/001018
§ 371 (c)(1),
(2), (4) Date: Sep. 23, 2010

(87) PCT Pub. No.: WO2009/119015
PCT Pub. Date: Oct. 1, 2009

(65) Prior Publication Data
US 2011/0012465 A1 Jan. 20, 2011

(30) Foreign Application Priority Data

Mar. 27, 2008 (JP) ................................. 2008-082807

(51) Int. Cl.
H02K 1/24 (2006.01)
H02K 1/27 (2006.01)
(52) U.S. Cl. ............................ 310/156.53; 310/216.092
(58) Field of Classification Search ............. 310/156.49, 310/156.53, 156.55–156.56, 216.092–216.094, 310/216.111
See application file for complete search history.

(56) References Cited

U.S. PATENT DOCUMENTS

| | | | | |
|---|---|---|---|---|
| 5,223,759 A * | 6/1993 | Shimoda et al. | ......... | 310/156.54 |
| 6,147,428 A | 11/2000 | Takezawa et al. | | |
| 6,525,442 B2 * | 2/2003 | Koharagi et al. | ........ | 310/156.48 |
| 6,812,614 B2 * | 11/2004 | Yamamoto et al. | ........ | 310/261.1 |
| 6,847,144 B1 * | 1/2005 | Luo | .......................... | 310/156.49 |
| 7,042,127 B2 * | 5/2006 | Tsuruta et al. | ............ | 310/156.53 |
| 7,411,329 B2 * | 8/2008 | Murakami et al. | ....... | 310/156.45 |
| 7,550,891 B2 * | 6/2009 | Kim | ....................... | 310/216.092 |
| 7,605,510 B2 * | 10/2009 | Okuma et al. | ........... | 310/156.53 |

(Continued)

FOREIGN PATENT DOCUMENTS

CN 1196597 10/1998

(Continued)

*Primary Examiner* — Burton Mullins
(74) *Attorney, Agent, or Firm* — Hamre, Schumann, Mueller & Larson, P.C.

(57) ABSTRACT

A rotor (21) is an interior permanent magnet rotor formed of a rotor core (24) in which a plurality of permanent magnets (25) are embedded at predetermined intervals. First protruding portions (26) and second protruding portions (27) are formed on an outer peripheral face of the rotor, the first protruding portions (26) each opposing the vicinity of a central portion of each of the permanent magnets and having a substantially arc-shaped cross section protruding outward and the second protruding portions (27) each opposing the vicinity of an end portion of each of the permanent magnets and protruding outward. One first protruding portion and two second protruding portions correspond to one permanent magnet. The formation of the first and second protruding portions as described above on the outer peripheral face of the rotor makes it possible to sufficiently reduce the torque ripple and the noise caused by the distortion of air-gap magnetic flux distribution.

3 Claims, 7 Drawing Sheets

U.S. PATENT DOCUMENTS

| | | | |
|---|---|---|---|
| 7,683,518 B2 * | 3/2010 | Yoshikawa et al. | 310/216.055 |
| 2010/0213780 A1 * | 8/2010 | Lee et al. | 310/156.53 |
| 2011/0050022 A1 * | 3/2011 | Li et al. | 310/156.46 |

FOREIGN PATENT DOCUMENTS

| | | |
|---|---|---|
| EP | 0 872 944 | 10/1998 |
| EP | 2 012 410 | 1/2009 |
| JP | 2002-84695 | * 3/2002 |
| JP | 2002-95194 | 3/2002 |
| JP | 2004-328956 | 11/2004 |
| JP | 2005-354798 | 12/2005 |
| WO | 2007/125753 | 11/2007 |
| WO | 2008/139675 | * 11/2008 |

* cited by examiner

INTERIOR PERMANENT MAGNET ROTOR, ELECTRIC MOTOR USING THE SAME AND ELECTRIC DEVICE

TECHNICAL FIELD

The present invention relates to an interior permanent magnet rotor formed of a rotor core in which a plurality of permanent magnets are embedded at predetermined intervals and an electric motor using the rotor. Moreover, the present invention relates to an electrical device provided with the electric motor.

BACKGROUND ART

Patent Document 1 describes an interior permanent magnet rotor formed of a rotor core in which a plurality of permanent magnets are embedded at predetermined intervals. In Patent Document 1, in a cross section perpendicular to a central axis of rotation, the rotor has protruding portions formed on an outer peripheral face thereof, the protruding portions each opposing the vicinity of a central portion of each permanent magnet and having an arc-shaped cross section protruding outward. With the rotor having such a configuration, the distance between the rotor and a stator is maximized in the vicinity of magnetic pole end portions of the rotor, which makes it difficult for magnetic flux to pass through such areas. Thus, magnetic flux generated by each permanent magnet can be linked effectively with the stator, and a decrease in electromotive force can therefore be prevented. Moreover, with the rotor having the above-described configuration, the distribution of magnetic flux density generated by the rotor can be approximated to a sinusoidal waveform. Thus, during rotation, magnetic flux linked with the stator can be smoothly increased and decreased, and the pulsation of an electromotive force waveform therefore can be reduced.

However, according to the invention described in Patent Document 1, since the distance between the rotor and the stator in areas between adjacent protruding portions becomes excessively large, torque ripple cannot be reduced sufficiently.

Patent Document 2 describes an invention for reducing the torque ripple. In Patent Document 2, in a cross section perpendicular to a central axis of rotation, a rotor has first protruding portions and, furthermore, second protruding portions formed on an outer peripheral face thereof, the first protruding portions each opposing the vicinity of the center of each permanent magnet and having an arc-shaped cross section protruding outward and the second protruding portions each opposing an area between permanent magnets and protruding outward. With the rotor having such a configuration, it is possible to reduce torque ripple while improving output torque.

Patent Document 1: JP 2002-95194A
Patent Document 2: JP 2005-354798A

DISCLOSURE OF INVENTION

Problems to be Solved by the Invention

The invention described in Patent Document 2 can reduce the torque ripple more than the invention described in Patent Document 1. However, distortion of the air-gap magnetic flux distribution cannot be reduced, and so there is a problem in that noise caused by the distortion of air-gap magnetic flux distribution cannot be reduced.

The present invention has been made to solve conventional problems such as described above, and it is an object of the present invention to provide an interior permanent magnet rotor and an electric motor that are capable of sufficiently reducing the torque ripple and the noise caused by the distortion of air-gap magnetic flux distribution. It is another object of the present invention to provide a high-output, low-vibration, low-noise electrical device.

Means for Solving Problems

An interior permanent magnet rotor of the present invention is an interior permanent magnet rotor formed of a rotor core in which a plurality of permanent magnets are embedded at predetermined intervals. First protruding portions and second protruding portions are formed on an outer peripheral face of the rotor, the first protruding portions each opposing the vicinity of a central portion of each of the permanent magnets and having a substantially arc-shaped cross section protruding outward and the second protruding portions each opposing the vicinity of an end portion of each of the permanent magnets and protruding outward. One of the first protruding portions and two of the second protruding portions correspond to one of the permanent magnets.

An electric motor of the present invention includes the above-described interior permanent magnet rotor of the present invention.

An electrical device of the present invention includes the above-described electric motor of the present invention.

EFFECTS OF THE INVENTION

According to the present invention, since one first protruding portion and a pair of second protruding portions sandwiching the first protruding portion are formed for each permanent magnet, the torque ripple and the noise caused by the distortion of air-gap magnetic flux distribution can be reduced sufficiently.

DESCRIPTION OF THE INVENTION

Hereinafter, a preferred embodiment of the present invention will be described with reference to the drawings.

Figure 1:
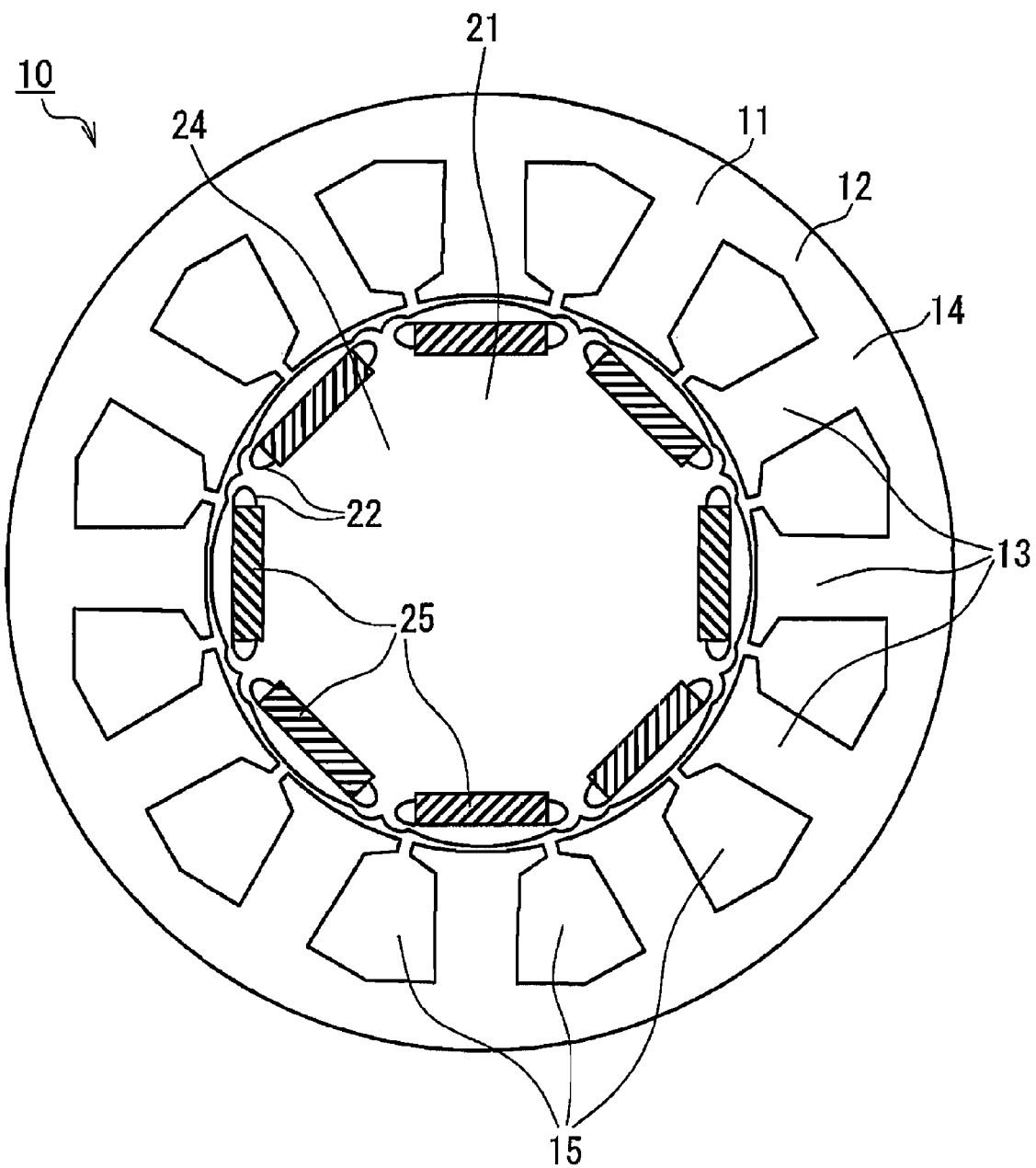
FIG. 1 is a cross-sectional view of an electric motor (hereinafter referred to as an "interior permanent magnet electric motor") provided with an interior permanent magnet rotor according to an embodiment of the present invention.

FIG. 1 is a cross-sectional view of an interior permanent magnet electric motor 10 according to an embodiment of the present invention taken along a plane perpendicular to a central axis of rotation.

The electric motor 10 according to the present embodiment includes a stator 11 and a rotor 21.

The stator 11 includes a stator core 14 formed from a laminate of a plurality of high-permeability thin iron plates that have been punched out with a press and windings (not shown) wound around the stator core 14. The stator core 14 has a yoke 12, a plurality of teeth 13 formed on an inner circumferential side of the yoke 12, and a plurality of slots 15 formed between adjacent teeth 13. The windings are wound around the stator core 14 by concentrated winding and housed in the slots 15.

The rotor 21 includes a rotor core 24 in which a plurality of magnet embedding holes 22 are formed at predetermined intervals, permanent magnets 25 embedded in the respective magnet embedding holes 22, and a pair of end plates (not shown) disposed at both ends in the direction of the central axis of rotation (hereinafter simply referred to as the "axial direction"). The rotor core 24 is formed by laminating, in the axial direction, a plurality of high-permeability thin iron plates having the magnet embedding holes 22 formed therein. The permanent magnets 25 for forming magnetic poles of the rotor 21 are housed and retained in the respective magnet embedding holes 22. The pair of end plates is fastened to the rotor core 24 by a caulking pin (not shown). A rotation shaft (not shown) is fastened to the center of the rotor core 24, and the rotor core 24 is supported rotatably by a bearing (not shown).

The rotor 21 configured as described above opposes an inner circumferential face of the teeth 13 of the stator 11 via an air-gap.

It should be noted that although FIG. 1 shows a case where the number of poles of the rotor 21 is eight (the number of pole pairs is four) and the number of slots of the stator 11 is twelve, the present invention is not limited to this combination and other combinations also can be applied.

Figure 2:
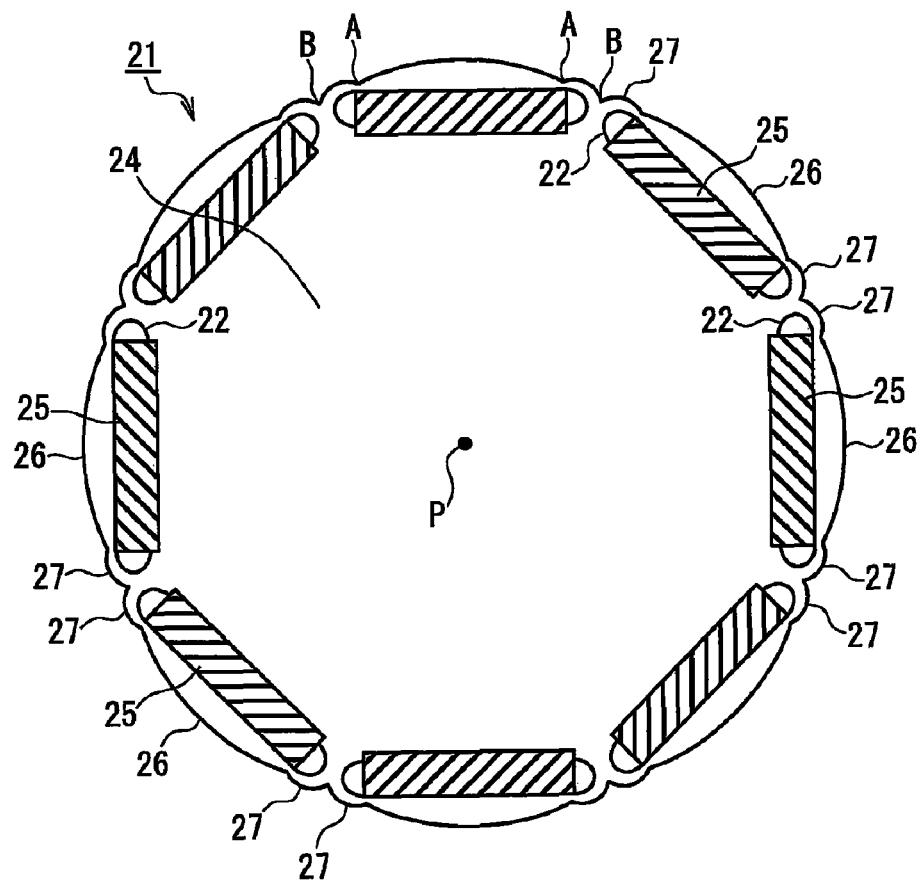
FIG. 2 is a cross-sectional view of the interior permanent magnet rotor according to the embodiment of the present invention.
Figure 3:
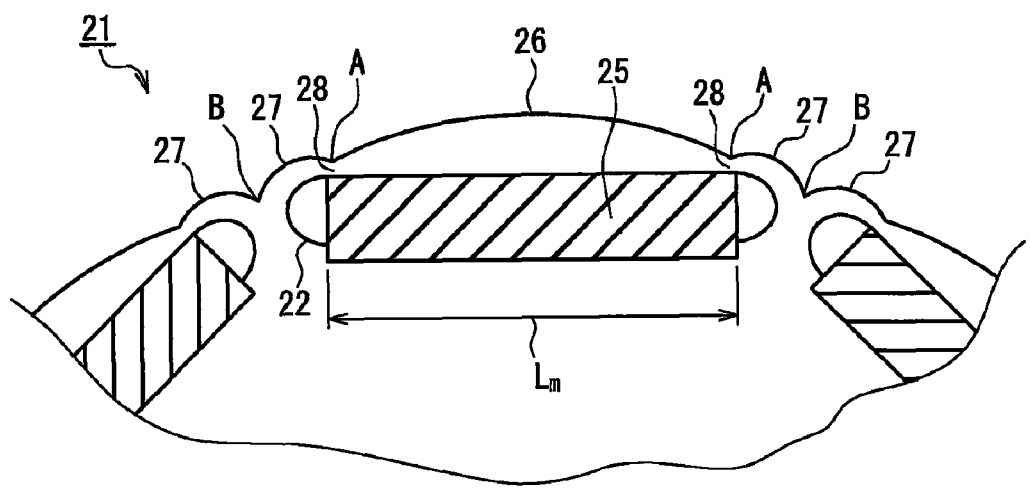
FIG. 3 is a fragmentary enlarged cross-sectional view showing an outer peripheral face corresponding to a single magnetic pole of the rotor in FIG. 2.

FIG. 2 is a cross-sectional view of the rotor 21 taken along a plane perpendicular to the central axis of rotation. FIG. 3 is a fragmentary enlarged cross-sectional view showing an outer peripheral face of the rotor 21 corresponding to a single magnetic pole, that is, a single permanent magnet 25 of the rotor 21 in FIG. 2.

In FIGS. 2 and 3, each magnet embedding hole 22 has a shape slightly larger than a cross section of the permanent magnet 25 to be inserted therein. The permanent magnet 25 is fixed in the magnet embedding hole 22 using an adhesive or the like.

First protruding portions 26 each opposing the vicinity of a central portion of each permanent magnet 25 and protruding outward and second protruding portions 27 each opposing the vicinity of an end portion of each permanent magnet 25 and protruding outward are formed on the outer peripheral face of the rotor 21. The first protruding portions 26 have a substantially arc-shaped cross section. Preferably, the second protruding portions 27 also have a substantially arc-shaped cross section. Here, the "substantially arc-shaped cross section" means that a cross-sectional shape along a plane perpendicular to the central axis of rotation is a substantially arc shape. The "substantially arc shape" is not necessarily an exact arc, and any shape can be sufficient as long as it can approximate an arc. For example, the shape may be formed from a plurality of curves or a plurality of straight lines joined together.

One first protruding portion 26 and two second protruding portions 27 correspond to one permanent magnet 25. That is to say, equiangularly spaced protruding portion sets each consisting of one first protruding portion 26 and two second protruding portions 27 on both sides thereof are formed on the outer peripheral face of the rotor 21 in one-to-one correspondence with the permanent magnets 25.

A depression is formed between adjacent ones of the first protruding portion 26 and the second protruding portion 27. That is to say, each second protruding portion 27 protrudes outward in such a manner that the distance from a center point P of the rotor 21 to the top of the second protruding portion 27 (a point on the second protruding portion 27 that is farthest from the center point P) is larger than the distance from the center point P of the rotor 21 to a boundary point A between the first protruding portion 26 and the second protruding portion 27.

Preferably, the second protruding portion 27 has a substantially arc-shaped cross section having a smaller radius of curvature than the substantially arc-shaped cross section of the first protruding portion 26. If the substantially arc-shaped cross section of the second protruding portion 27 has an excessively large radius of curvature, the torque ripple and the distortion of air-gap magnetic flux distribution increase.

On the other hand, preferably, the distance between a pair of boundary points A-A sandwiching the first protruding portion 26 is shorter than a length Lm of the permanent magnet 25 in a longitudinal direction. Conversely, if the distance between the pair of boundary points A-A is made longer than the length Lm of the permanent magnet 25 with an outer diameter of the rotor core 24 remaining fixed, the radius of curvature of the first protruding portion 26 needs to be increased, and as a result, the waveform of an electromotive force becomes rectangular, which leads to an increase in the torque ripple and the distortion of air-gap magnetic flux distribution.

Generally, there is a trade-off relationship between the above-described reduction in the radius of curvature of the second protruding portion 27 and reduction in the distance between the pair of boundary points A-A. The torque ripple and the distortion of air-gap magnetic flux distribution can be reduced by appropriately setting the radius of curvature of the second protruding portion 27 and the distance between the pair of boundary points A-A so as to meet the above-described preferred conditions.

A boundary point B between the second protruding portions 27 adjacent to each other is located in such a position that the distance from the center point P of the rotor 21 to the boundary point B is shorter than the distance from the center point P of the rotor 21 to the top of the second protruding portions 27. The torque ripple and the distortion of air-gap magnetic flux distribution can be reduced by providing a depression between adjacent second protruding portions 27 in this manner.

From the standpoint of punching out the high-permeability thin iron plates from which the rotor core 24 is formed, it is preferable that the width of portions (rotor bridge portions) 28 where the distance between the magnet embedding holes 22 and the outer peripheral face of the rotor 21 is minimum is not less than a plate thickness d of the high-permeability thin iron plates. However, at a large width of the rotor bridge portions 28, magnetic flux components of magnetic flux generated by each permanent magnet 25 passing through the rotor bridge portions 28 increase, whereas magnetic flux components linking with the stator 11 decrease, and thus, an output of the electric motor decreases. Therefore, setting the width of the rotor bridge portions 28 as small as possible so that magnetic saturation occurs in the rotor bridge portions 28 is preferable because more magnetic flux components can be linked with the stator 11.

Next, effects of the present invention will be described by comparing the interior permanent magnet electric motor according to the embodiment of the present invention and the interior permanent magnet electric motors according to conventional examples.

Figure 4:
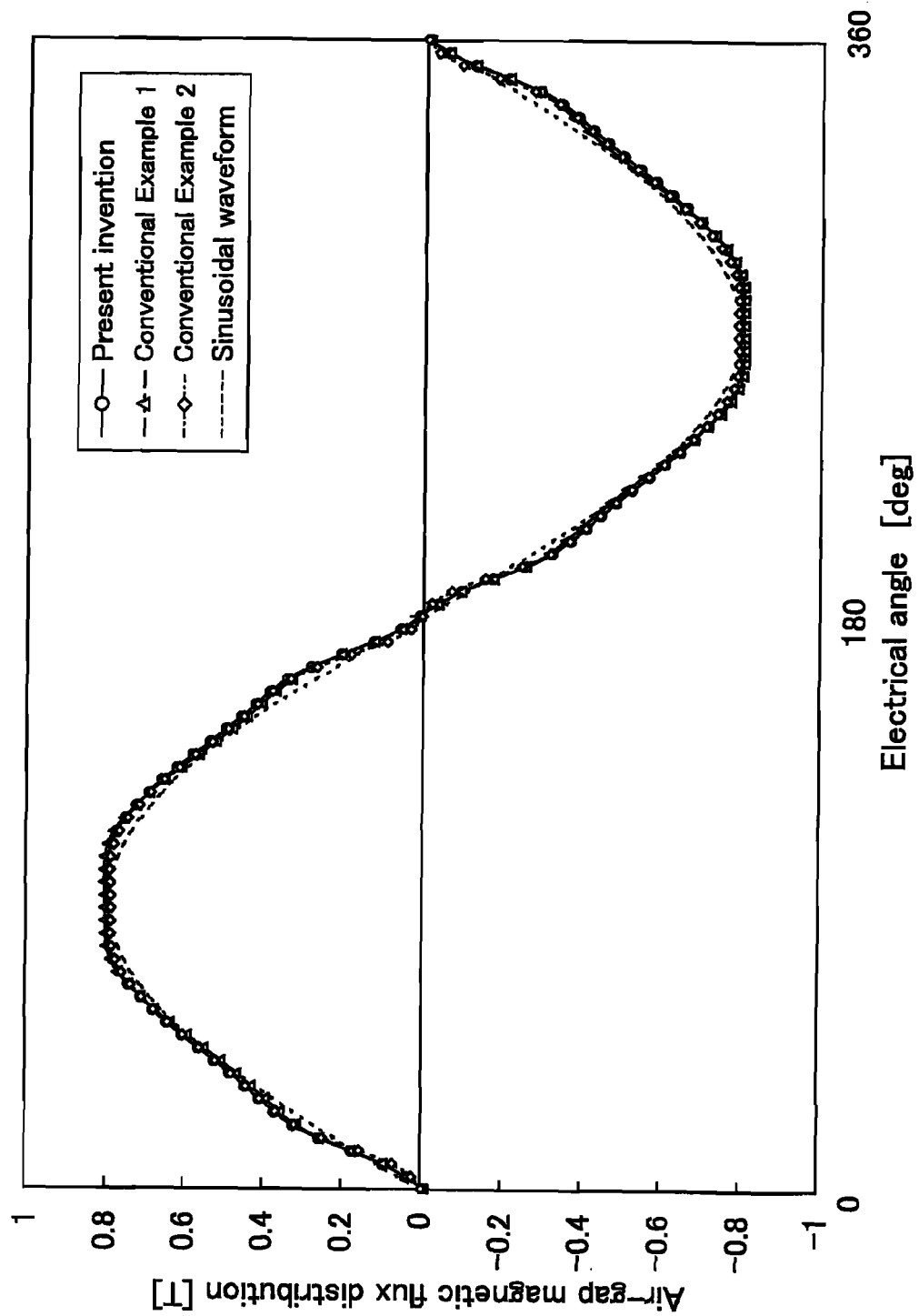
FIG. 4 is a diagram showing the relationships between air-gap magnetic flux distribution and electrical angle of the interior permanent magnet electric motor according to the embodiment of the present invention and interior permanent magnet electric motors according to Conventional Examples 1 and 2.
Figure 5:
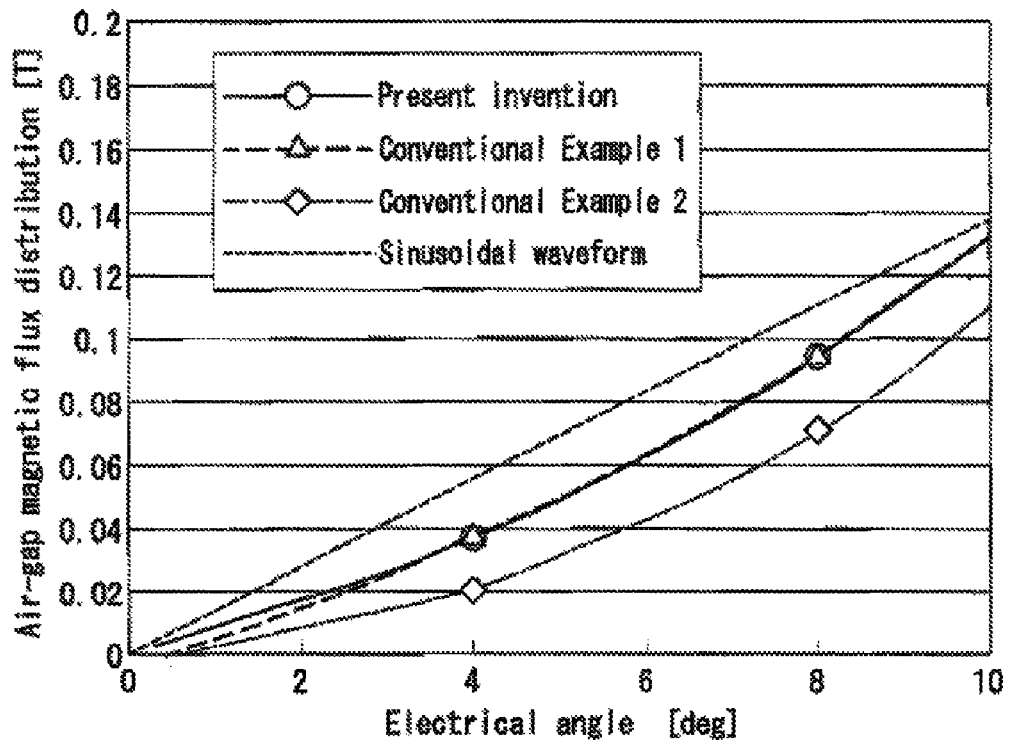
FIG. 5 is an enlarged diagram showing a segment between 0 electrical degrees and 10 electrical degrees of FIG. 4.
Figure 6:
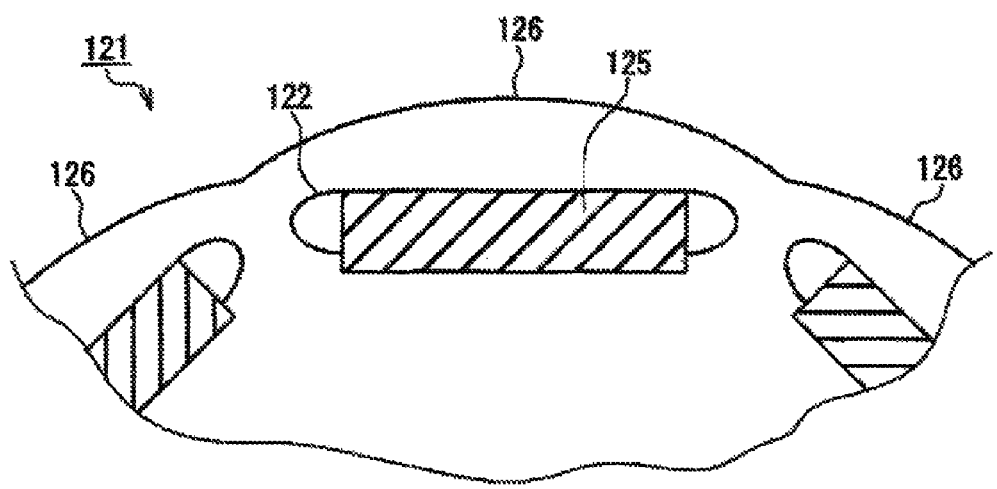
FIG. 6 is a fragmentary enlarged cross-sectional view showing an outer peripheral face corresponding to a single magnetic pole of an interior permanent magnet rotor according to Conventional Example 1.
Figure 7:
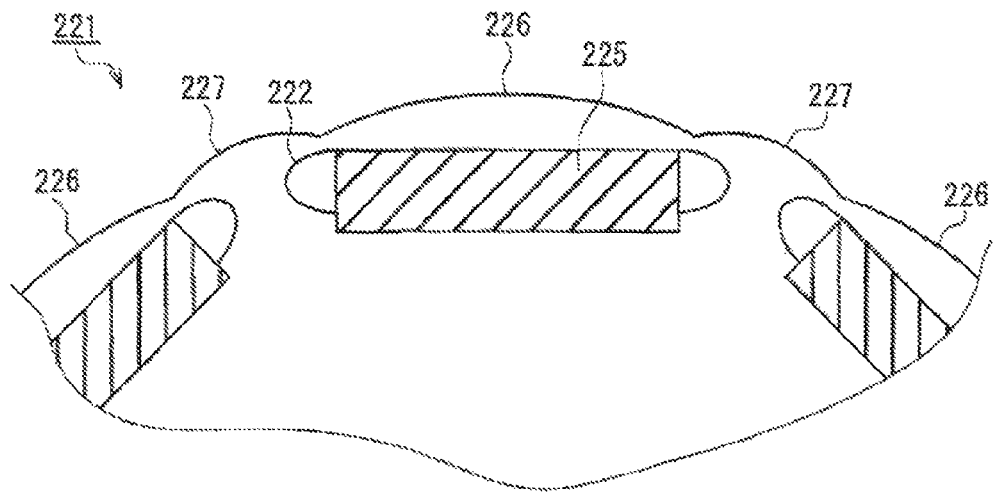
FIG. 7 is a fragmentary enlarged cross-sectional view showing an outer peripheral face corresponding to a single magnetic pole of an interior permanent magnet rotor according to Conventional Example 2.

FIG. 4 is a diagram showing analytically obtained relationships between air-gap magnetic flux distribution and electrical angle of the interior permanent magnet electric motor according to the embodiment of the present invention and interior permanent magnet electric motors according to Conventional Examples 1 and 2, and FIG. 5 is an enlarged diagram of a segment between 0 electrical degrees and 10 electrical degrees of FIG. 4. FIGS. 4 and 5 also show a sinusoidal waveform for comparison. FIGS. 6 and 7 are fragmentary enlarged views showing an outer peripheral face of rotors of the interior permanent magnet electric motors according to Conventional Examples 1 and 2, corresponding to a single magnetic pole, that is, a single permanent magnet of the rotors.

A rotor 121 of Conventional Example 1 shown in FIG. 6 corresponds to the interior permanent magnet rotor described in Patent Document 1 mentioned above. Similarly to the rotor 21 of the present invention, permanent magnets 125 are retained individually in a plurality of magnet embedding holes 122. Protruding portions 126 each opposing the vicinity of a central portion of each permanent magnet 125 and having a single substantially arc-shaped cross section protruding outward are formed on the outer peripheral face of the rotor 121.

A rotor 221 of Conventional Example 2 shown in FIG. 7 corresponds to the interior permanent magnet rotor described in Patent Document 2 mentioned above. Similarly to the rotor 21 of the present invention, permanent magnets 225 are retained individually in a plurality of magnet embedding holes 222. First protruding portions 226 each opposing the vicinity of a central portion of each permanent magnet 225 and having a substantially arc-shaped cross section protruding outward and second protruding portions 227 protruding outward between adjacent first protruding portions 126 are formed on the outer peripheral face of the rotor 221.

The slope of the segment between 0 electrical degrees and 10 electrical degrees of the individual charts shown in FIGS. 4 and 5 (i.e., the slope of straight lines obtained by linear approximation of that segment) is 0.014 for the sinusoidal waveform, 0.01095 for the interior permanent magnet electric motor of the present invention, 0.0108 for the interior permanent magnet electric motor of Conventional Example 1, and 0.0059 for the interior permanent magnet electric motor of Conventional Example 2. That is to say, the air-gap magnetic flux distribution of the interior permanent magnet electric motor of Conventional Example 2 significantly deviates from the sinusoidal waveform especially between 0 electrical degrees and 10 electrical degrees when compared with the air-gap magnetic flux distribution of the interior permanent magnet electric motor of the present invention. It can be considered that this is because, in Conventional Example 2, due to the presence of the second protruding portions 227, the flow of magnetic flux cannot change smoothly and switch when the magnetic pole of magnetic flux linking with the stator switches. Such deviation from the sinusoidal waveform between 0 electrical degrees and 10 electrical degrees will significantly influence high-order components of noise, especially of the 46th order or higher.

Figure 8:
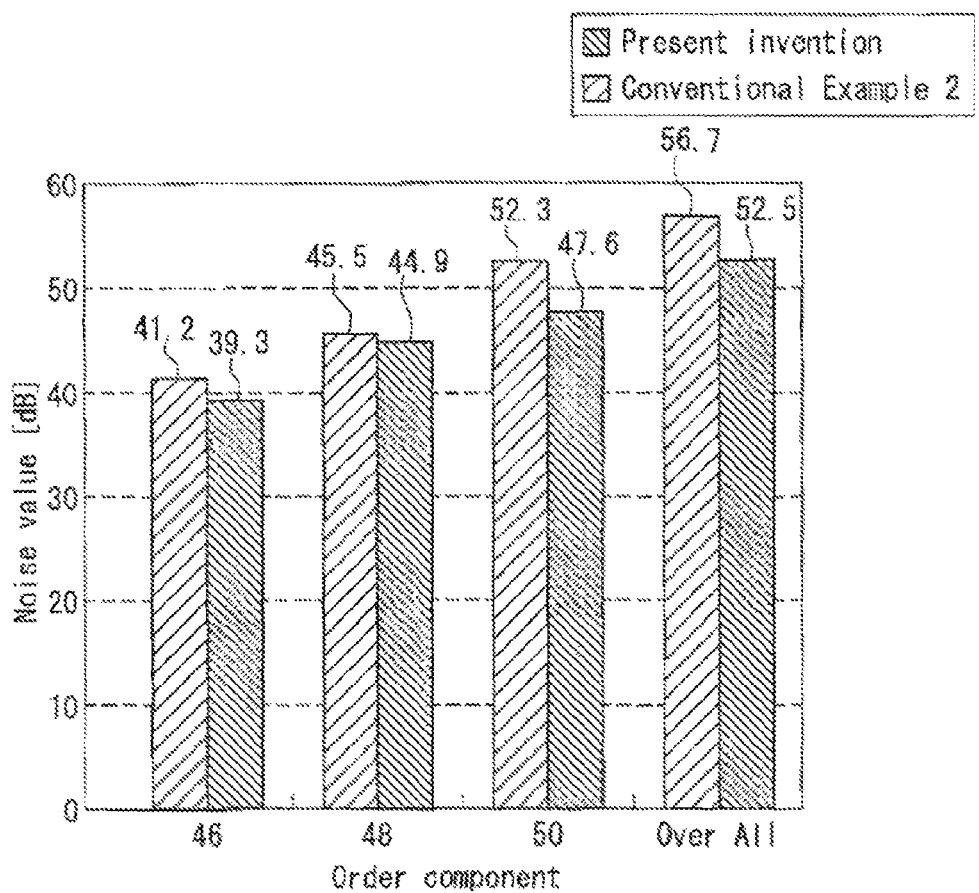
FIG. 8 is a diagram showing noise of the 46th order and higher, divided into individual order components, of the interior permanent magnet electric motor according to the embodiment of the present invention and the interior permanent magnet electric motor according to Conventional Example 2.

FIG. 8 is a diagram showing noise of the 46th order or higher, divided into individual order components, of the interior permanent magnet electric motor according to the embodiment of the present invention and the interior permanent magnet electric motor according to Conventional Example 2. It should be noted that "Over All" indicates the sum total of all the order components of noise. It can be seen from FIG. 8 that in the case of the interior permanent magnet electric motor according to Conventional Example 2 whose air-gap magnetic flux distribution significantly deviates from the sinusoidal waveform between 0 electrical degrees and 10 electrical degrees, the high-order components of noise of the 46th order or higher are greater than those in the case of the interior permanent magnet electric motor according to the embodiment of the present invention.

Figure 9:
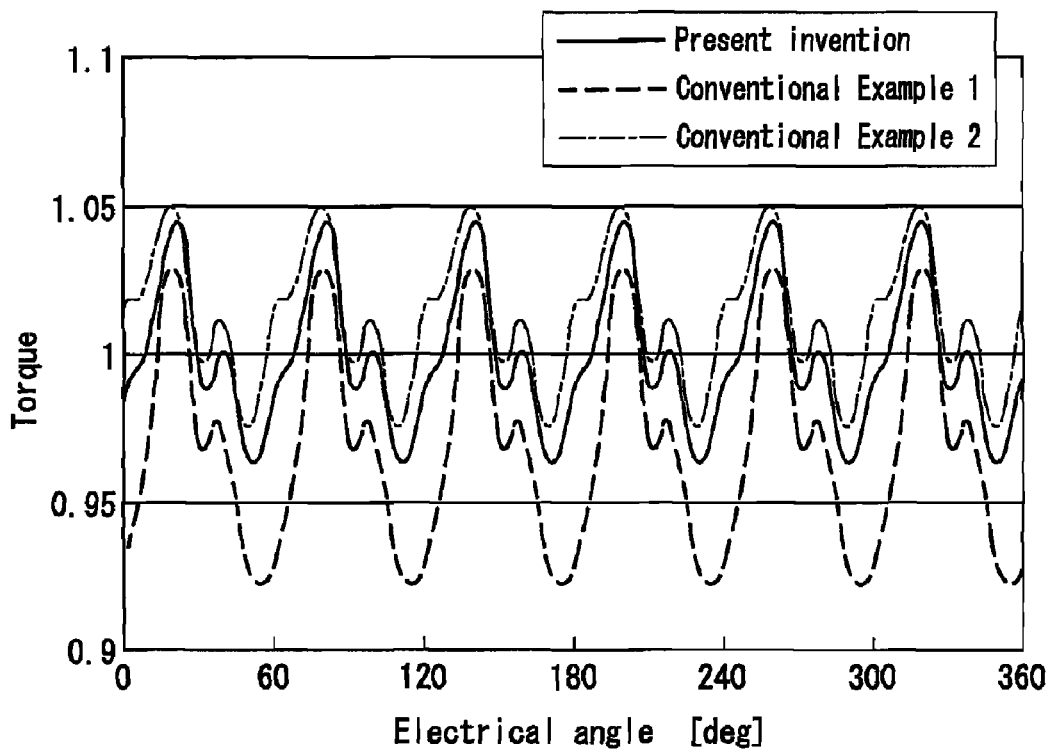
FIG. 9 is a diagram showing the relationships between torque and electrical angle of the interior permanent magnet electric motor according to the embodiment of the present invention and the interior permanent magnet electric motors according to Conventional Examples 1 and 2.

FIG. 9 is a diagram showing analytically obtained relationships between torque and electrical angle of the interior permanent magnet electric motor according to the embodiment of the present invention and the interior permanent magnet electric motors according to Conventional Examples 1 and 2. The torque on the vertical axis is normalized by taking an average value of the present invention as "1".

As shown in FIG. 9, the interior permanent magnet electric motor according to Conventional Example 1 generates lower torque and has more torque ripple than the interior permanent magnet electric motor according to the present invention. It can be considered that this is because pulsation of a magnet torque cannot be cancelled out in the interior permanent magnet electric motor according to Conventional Example 1 due to its small reluctance torque.

From the foregoing, it can be said that the interior permanent magnet electric motor according to the present invention, in which the torque ripple can be reduced and the noise can be reduced, has higher performance than the interior permanent magnet electric motor according to Conventional Example 1 (i.e., Patent Document 1), which cannot reduce the torque ripple, and the interior permanent magnet electric motor according to Conventional Example 2 (i.e., Patent Document 2), which cannot reduce the amount of noise.

Next, an air conditioner indoor unit 300 and an air conditioner outdoor unit 400 will be described using the drawings as examples of an electrical device that uses the electric motor according to the present invention.

Figure 10:
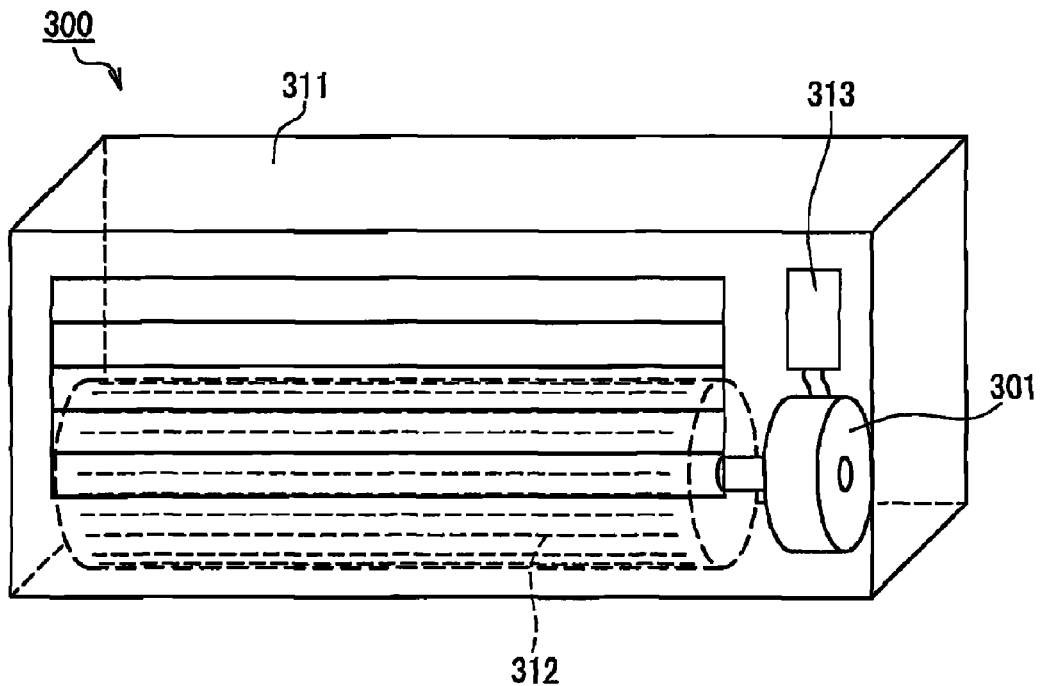
FIG. 10 is a schematic view showing an example of an air conditioner indoor unit.

FIG. 10 is a schematic view showing an example of the air conditioner indoor unit 300.

The air conditioner indoor unit 300 has an electric motor 301 installed in a housing 311. A cross-flow fan 312 is mounted on a rotation shaft of the electric motor 301. The electric motor 301 is driven by an electric motor drive 313. The electric motor 301 rotates when energized by the electric motor drive 313, and accordingly, the cross-flow fan 312 rotates. The rotation of the cross-flow fan 312 sends air that has been air-conditioned by an indoor unit exchanger (not shown) into a room. The interior permanent magnet electric motor according to the present invention can be applied as the electric motor 301. A high-output, low-vibration, low-noise air conditioner indoor unit can be realized by applying the electric motor according to the present invention.

Figure 11:
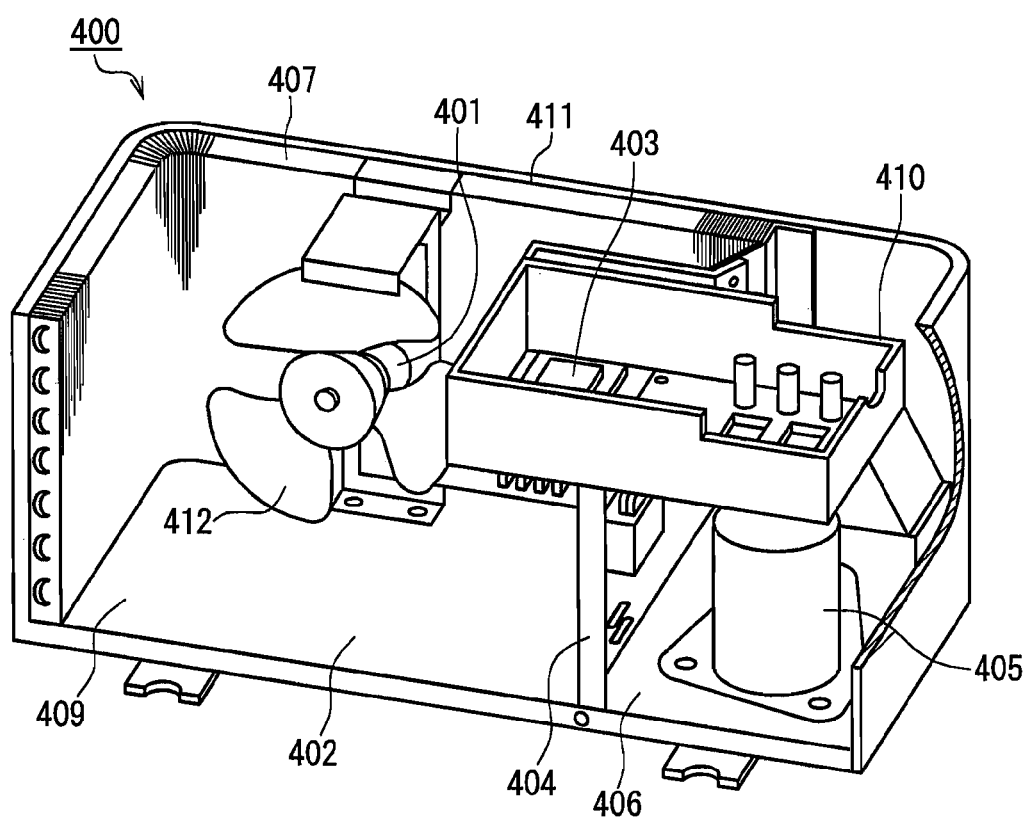
FIG. 11 is a schematic view showing an example of an air conditioner outdoor unit.

FIG. 11 is a schematic view showing an example of the air conditioner outdoor unit 400.

The air conditioner outdoor unit 400 has an electric motor 401 installed in a housing 411. A fan 412 is mounted on a rotation shaft of the electric motor 401, and the electric motor 401 functions as a blower fan motor.

An internal space of the air conditioner outdoor unit 400 is partitioned into a compressor compartment 406 and a heat exchanger compartment 409 by a partition plate 404 provided upright on a base plate 402 of the housing 411. A compressor 405 is disposed in the compressor compartment 406. A heat exchanger 407, the electric motor 401, and the fan 412 are disposed in the heat exchanger compartment 409. An electrical component box 410 is disposed on top of the partition plate 404. An electric motor drive 403 is accommodated in the electrical component box 410.

The electric motor 401 rotates when energized by the electric motor drive 403, and accordingly, the fan 412 rotates. The rotation of the fan 412 generates a current of air inside the heat exchanger compartment 409, and during the passage of the current of air through the heat exchanger 407, heat is transferred between the current of air and the heat exchanger 407. The interior permanent magnet electric motor according to the present invention can be applied as the electric motor 401. A high-output, low-vibration, low-noise air conditioner outdoor unit can be realized by applying the electric motor according to the present invention.

The above-described embodiment is illustrative only, and it should be understood that the present invention is not limited to this embodiment and appropriate changes can be made thereto. For example, part of the configuration of the above-described embodiment may be replaced by another known configuration. Moreover, configurations that are not mentioned in the above-described embodiment are optional, and, for example, a known configuration may be selected as appropriate and combined with the present invention.

The electric motor of the present invention is not limited to the above-described air conditioner indoor unit and air conditioner outdoor unit and can be extensively applied to various electrical devices, such as a water heater and an air cleaner, in which electric motors are used.

Industrial Applicability

There is no particular limitation to the field of use of the present invention, and the present invention can be extensively used as, for example, an electric motor including an interior permanent magnet rotor. According to the present invention, the torque ripple and the noise caused by the distortion of air-gap magnetic flux distribution can be reduced, and therefore, the present invention can be used particularly preferably as an interior permanent magnet rotor, an electric motor, and an electrical device that are required to have high-output as well as low-vibration and low-noise.

The invention claimed is:

1. An interior permanent magnet rotor, comprising:
   a rotor core in which a plurality of permanent magnets are embedded at predetermined intervals; and
   first protruding portions and second protruding portions formed on an outer peripheral face of the rotor,
   wherein each of the first protruding portions opposes a vicinity of a central portion of each of the permanent magnets and has a substantially arc-shaped cross section protruding outward,
   each of the second protruding portions opposes a vicinity of an end portion of each of the permanent magnets and protrudes outward,
   one of the first protruding portions and two of the second protruding portions correspond to one of the permanent magnets,
   each of the second protruding portions has a substantially arc-shaped cross section having a smaller radius of curvature than the substantially arc-shaped cross section of each of the first protruding portions, and
   a depression is disposed between adjacent one of the first protruding portions and one of the second protruding portions.

2. An electric motor comprising the interior permanent magnet rotor according to claim 1.

3. An electrical device comprising the electric motor according to claim 2.

* * * * *